United States Patent [19]
Goodrich, Jr. et al.

[11] 3,791,748
[45] Feb. 12, 1974

[54] BALL JOINT WITH MANUALLY OPERABLE, SENSIBLE WEAR INDICATOR

[75] Inventors: Stanley R. Goodrich, Jr., Saginaw; Jerry M. Roethlisberger, Bridgeport, both of Mich.

[73] Assignee: Dart Industries Inc., Los Angeles, Calif.

[22] Filed: Apr. 17, 1972

[21] Appl. No.: 244,683

[52] U.S. Cl.................. 403/27, 116/114 Q, 403/131
[51] Int. Cl. ............................................. F16b 7/00
[58] Field of Search........ 287/87, 90 R, 90 C, 85 A; 29/149.5 B; 116/114 Q; 308/1 R

[56] References Cited
UNITED STATES PATENTS
3,343,856  9/1967  Cislo ................................ 287/90 R
3,533,491  10/1970  Svenson ........................... 116/114 Q Primary Examiner—Andrew V. Kundrat
Attorney, Agent, or Firm—F. J. Fodale

[57] ABSTRACT

A ball joint subject to wear in normal use and having fixed internal bearing seats in its housing for the ball stud unit giving rise to play or lash as the wear takes place has a manually operable wear indicator. The indicator is mounted on the housing cover in telescoping relationship with respect thereto and is manually operable to accumulate the play occasioned by the wear as a spacing between the ball stud unit and the fixed bearing seat on the cover. Indications are provided by the indicator and the cover cooperatively to identify to the operator whether wear justifying replacement does or does not exist. Wear justifying replacement is indicated when the indicator is manually movable to a position having a predetermined relationship with the cover which is sensible by the operator.

5 Claims, 2 Drawing Figures

BALL JOINT WITH MANUALLY OPERABLE, SENSIBLE WEAR INDICATOR

Our invention relates generally to ball joints and more specifically to ball joints of the type where the internal bearing seats for the ball stud unit are fixed in spatial relation to each other.

Such ball joints are a basic mechanical element which are always assembled into a more comprehensive mechanical device and as used in the mechanical device are normally subject to wear. The wear gives rise to lash or play in the joint which in time results in the ball joint no longer meeting the requirements of the mechanical device with which it is used. The cost of removing an in-service ball joint from the mechanical device to determine the lash in the ball joint due to wear after some period of use could be very large relative to the cost of the ball joint itself. Such a situation could lead to premature or late replacement of the ball joint neither of which is desirable. Therefore, an indication of the lash characteristics of a ball joint in a mechanical device which can be obtained without removing the pivot joint from the mechanical device is useful for both preventing the unnecessary cost of replacing yet serviceable ball joints and for indicating that a ball joint should be replaced.

In its broadest aspects then, the object of our invention is to provide a ball joint having fixed internal bearing seats for the ball stud unit in which the lash characteristics of the ball joint can be determined while the ball joint is in a mechanical device without disassembling the ball joint from that device.

Another object of our invention is to provide a ball joint wherein the amount of lash in the ball joint is sensibly determinable by an indicator carried by the ball joint and manually operable from the exterior of the ball joint so that the ball joint need not be removed from a more comprehensive mechanical device to determine if the ball joint is yet serviceable or if it requires replacement.

Another object of our invention is to provide a ball joint which carries an indicator on its cover which is manually operable from the exterior of the joint and movable with respect to the cover to a position having a predetermined relationship with the cover to indicate to the operator that replacement of the ball joint is warranted.

The exact nature of our invention, as well as other objects and features thereof, will be readily apparent from consideration of the following specification relating to the annexed drawings in which.

Figure 1:
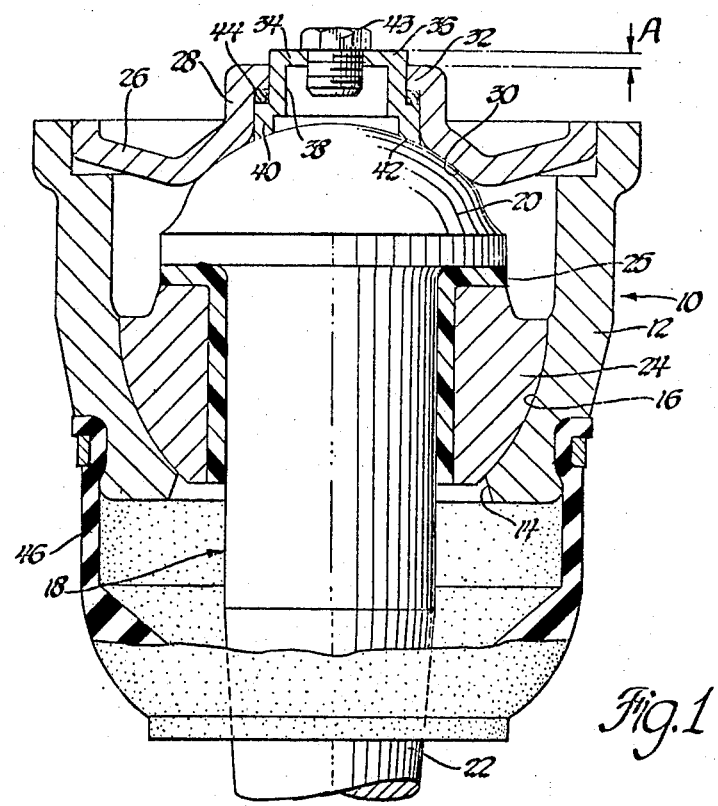
FIG. 1 is a sectional elevational view of a ball joint with a manually operable sensible wear indicator in accordance with our invention.

Referring now to the drawings and more specifically to FIG. 1 the ball joint indicated generally at 10 includes a housing 12 having an opening 14 at its lower end and a lower partispherical bearing seat 16. A ball stud unit 18 comprising a unitary head 20 and shank 22, a lower ball half 24 and a plastic sleeve 25 is disposed in the housing 12 with the lower ball half 24 in bearing engagement with the lower bearing seat 16. The upper end of the housing 12 is closed by a cover 26 which includes an upper bearing seat 30 in the shape of a concave spherical zone. The central portion of the cover 26 rises into tubular extension 28 having an inturned flange 32 at its upper end. The outer margin of the cover 26 is sealingly and fixedly secured to a counterbore at the upper end of the housing 12 with the bearing seat 30 thereon in bearing engagement with the head 20 of the ball stud unit 18. The cover 26 is secured to the housing 12 in such a manner that there is substantially no play or lash between the several parts of the ball stud unit 18 and the fixed bearing seats 16 and 30. A method for so securing the cover 26 is described in the U.S. Pat. No. 3,555,662 issued to Thomas C. Powell on Jan. 19, 1971 and assigned to the assignee of this invention.

When new, the ball joint 10 is substantially lash-free but as the ball joint is used, however, wear inevitably occurs on the bearing surfaces 16 and 30 and the surfaces on the ball stud unit 18 seated thereon resulting in lash or play in the joint. In order to provide a sensible indication on the exterior of the ball joint of the amount of wear which has taken place in the interior of the joint, the ball joint 10 includes a manually operable indicator 34. The indicator 34 is in the shape of an inverted cup having a flat upper wall 36 and a cylindrical wall 38 telescoped in the opening of the cover 26 formed by the inturned flange 32. The lower portion 40 of the cylindrical wall is stepped outwardly and is telescoped in the larger bore of the tubular extension 28. Above the stepped lower portion 40 and below the inturned flange 32 is a resilient O-ring 44 which provides a seal between the indicator 34 and the cover 26. The lower end of the indicator 34 terminates in a partispherical surface 42 which conforms to the surface of the head 20 of the ball stud unit 18. A plug 43 threaded into the upper wall 36 of the indicator is removable to supply grease to the interior of the housing 12. A flexible boot 46 mounted on the housing 12 and sealingly engaging the lower portion of the shank 22 which protrudes through the opening 14 of the housing 12 completes the ball joint assembly 10.

As previously mentioned, the ball joint assembly 10 when new has substantially no lash. In this condition, the indicator 34 which is in a telescoping relationship with the cover 26 has its flat upper wall 36 spaced above the upper surface of the inturned flange 32 on cover 26 a distance A when the partispherical surface 42 on the indicator 34 engages the head 20 of the ball stud unit 18. The distance A is indicative of a substantially lash free ball joint. As the ball joint is used in service, wear inevitably occurs between the movable parts of the ball joint resulting in axial play or lash which increases with wear. The amount of wear which has taken place in the interior of the joint can easily be determined sensibly from the exterior of the joint simply by pushing down on the indicator 34 until all the play in the ball stud unit 18 is taken up and the lower ball half 24 is seated on the bearing surface 16. The change in distance A is then indicative of the wear. If desired, suitable indicia may be inscribed on the exterior of the cylindrical wall 38 to provide a direct read out of distance to the upper surface of the inturned flange 32. In any event, wear sufficient to warrant replacement of the ball joint is conveniently indicated by preselecting the distance A so that when the indicator 34 is pushed down on the ball stud unit 18 to take up the play and seat the lower ball half 24 on the bearing seat 16, the top surface of the upper wall 36 on the indicator 34 lies flush with the top surface of the inturned flange 32 on the cover 26. Such a condition is easily sensed either visually or through touch such as by an operator's finger used to manually actuate the indicator.

Figure 2:
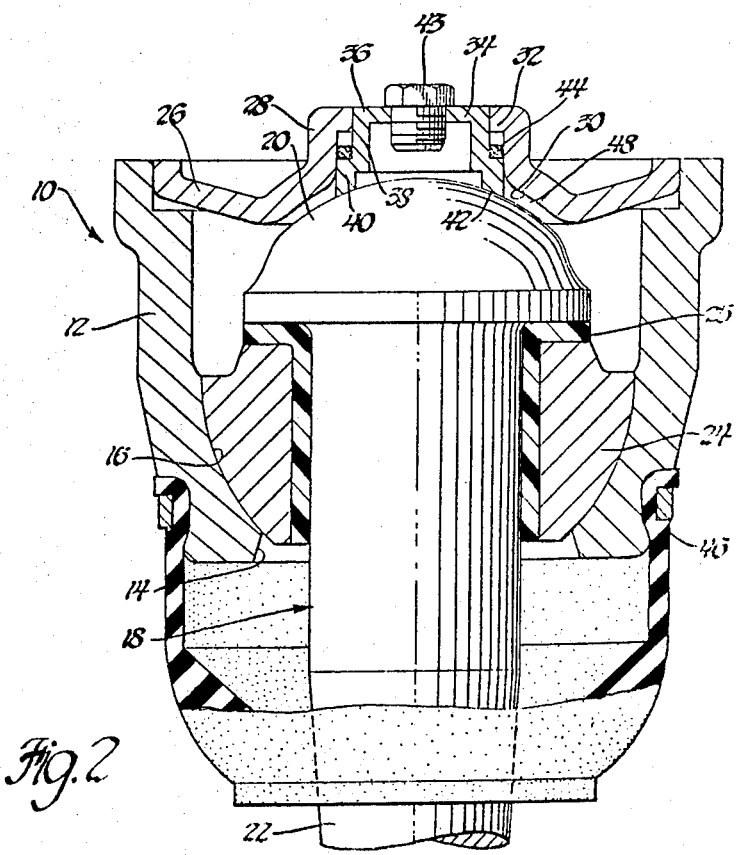
FIG. 2 is a view similar to FIG. 1 and shows the manually operable indicator in an operative position which sensibly indicates that the ball joint should be replaced.

FIG. 2 shows the indicator 34 after it has been manually telescoped into the cover 26 to accumulate all the internal play in the ball joint as a spacing between the head 20 and the upper bearing seat 30. In FIG. 2, the top surfaces of the inturned flange 32 on the cover 26 and the upper wall 36 of the indicator 34 are coplanar and the spacing resulting from the accumulation of the internal play is indicated at 48.

We wish it to be understood that we do not desire to be limited to the exact details of construction shown and described, for obvious modifications will occur to a person skilled in the art.

We claim:

1. A ball joint comprising,
a housing having an opening at one end,
a lower bearing seat in said housing adjacent said opening,
a stud unit having a ball portion and a shank portion, said ball portion being disposed in said housing and bearing against said lower bearing seat in an engagement subject to wear and said shank portion protruding through said opening at said one end,
a cover fixedly secured to said housing at the other end thereof,
an upper bearing seat on said cover in a fixed spatial relationship to said lower bearing seat, said upper bearing seat overlying and bearing against said ball portion in an engagement subject to wear, and
an indicator telescopingly mounted on said cover and movable in relation to said upper bearing seat, said wear indicator having a manually operable portion outside of said cover and a bearing portion inside of said cover, said bearing portion engaging said ball portion and seating it on said lower bearing seat and accumulating any clearances between said ball portion and said bearing seats caused by wear as a spacing between said ball portion and said upper bearing seat when said indicator is actuated by a manually applied force pushing said manually operable portion toward said cover, said manually operable portion having a conformation which in relationship to adjacent portions on the cover when said indicator is actuated gives a sensible indication of whether said wear is sufficient to warrant replacement of the ball joint.

2. A ball joint comprising,
a housing having an opening at one end,
a lower bearing seat in said housing adjacent said opening,
a stud unit having a ball portion and a shank portion, said ball portion being disposed in said housing and bearing against said lower bearing seat in an engagement subject to wear and said shank portion protruding through said opening at said one end,
a cover fixedly secured to said housing at the other end thereof, said cover having an interior surface which includes an upper bearing seat in the shape of a concave spherical zone, said upper bearing seat bearing against said ball portion in an engagement subject to wear,
a central tubular extension on said cover in alignment with said ball portion, said tubular extension being open at its lower end and having an inturned flange with a flat outer surface at its upper end,
an indicator telescopingly received in said tubular extension, said indicator having a flat upper surface and a lower bearing surface, said flat upper surface initially protruding from said tubular extension and spaced a distance from said flat outer surface so that as said joint wears said indicator is manually operable from the exterior of said joint to engage said ball potion with said lower bearing seat and accumulate said joint wear as a spacing between said ball portion and said upper bearing seat, said distance being predetermined so that when said joint wear is sufficient to warrant replacement said flat upper surface on said indicator lies flush with said flat outer surface on said cover giving a sensible indication thereof,
a stepped lower portion on said indicator, and
means including said stepped lower portion and said inturned flange to maintain said indicator in assembly with said ball joint.

3. A ball joint comprising,
a housing having an opening at one end,
a lower bearing seat in said housing adjacent said opening,
a stud unit having a ball portion and a shank portion, said ball portion being disposed in said housing and bearing against said lower bearing seat in an engagement subject to wear and said shank portion protruding through said opening at said one end,
a cover fixedly secured to said housing at the other end thereof, said cover having an upper bearing seat in fixed spatial relationship to said lower bearing seat and bearing against said ball portion in an engagement subject to wear,
a central tubular extension on said cover in alignment with said ball portion, said tubular extension having an opening at its lower end surrounded by said upper bearing seat and an opening at its upper end surrounded by a flat outer surface on said extension,
an indicator telescopingly received in said tubular extension and movable in relationship to said cover and upper bearing seat, said indicator having a lower end disposed in said tubular extension and an upper portion protruding from said tubular extension so that said indicator is manually operable from the exterior of said joint, said indicator when manually operated from the exterior of said joint engaging said lower end with said ball portion and accumulating joint wear as a spacing between said ball portion and said upper bearing seat, said upper portion having a conformation which aligns with said flat outer surface when said spacing accumulated from said joint wear is sufficient to warrant replacement of said joint, and
means to maintain said indicator in assembly with said ball joint.

4. A ball joint comprising,
a housing having an opening at one end,
a lower bearing seat in said housing adjacent said opening,
a stud unit having a ball portion and a shank portion, said ball portion being disposed in said housing and bearing against said lower bearing seat in an engagement subject to wear and said shank portion protruding through said opening at said one end, a cover fixedly secured to said housing at the other end thereof, said cover having an upper bearing seat in fixed spatial relationship to said lower bearing seat and bearing against said ball portion in an engagement subject to wear, a central tubular extension on said cover in alignment with said ball portion, said tubular extension having an opening at its lower end surrounded by said upper bearing seat and a reduced opening at its upper end, an indicator telescopingly received in said tubular extension and movable in relationship to said cover and upper bearing seat, said indicator having an enlarged lower end portion disposed below said reduced opening and an upper portion slidable in said reduced opening and initially protruding from said tubular extension so that said indicator is manually operable from the exterior of said joint, said lower end portion engaging said ball portion and seating said ball portion on said lower bearing surface and accumulating joint wear as a spacing between said ball portion and said upper bearing seat responsive to a manually applied downward force on said upper portion, said upper portion having conformations which align with portions of said cover adjacent said reduced opening when said spacing accumulated responsive to a manually applied downward force on said upper potion is sufficient to warrant replacement of said ball joint to give a sensible indication thereof.

5. A ball joint comprising, a housing having an opening at one end, a lower bearing seat in said housing adjacent said opening, a stud unit having a ball portion and a shank portion, said ball portion being disposed in said housing and bearing against said lower bearing seat in an engagement subject to wear and said shank portion protruding through said opening at said one end, a cover fixedly secured to said housing at the other end thereof, said cover having an upper bearing seat in fixed spatial relationship to said lower bearing seat and bearing against said ball portion in an engagement subject to wear, a central tubular extension on said cover in alignment with said ball portion, said tubular extension having an opening at its lower end surrounded by said upper bearing seat and a reduced opening at its upper end surrounded by a flat outer surface, and an indicator telescopingly received in said tubular extension and movable in relationship to said cover and upper bearing seat, said indicator having an enlarged lower end portion disposed below said reduced opening and a flat upper surface iniitally protruding from said tubular extension and sapced a distance from said flat outer surface so that as said joint wears, said indicator is manually operable from the exterior of said joint to engage said ball portion with said lower bearing seat and accumulate said joint wear as a spacing between said ball portion and said upper bearing seat, said distance being predetermined so that when said joint wear is sufficient to warrant replacement of said joint, said flat upper surface on said indicator aligns with said flat outer surface on said cover giving a sensible indication thereof.

* * * * *

UNITED STATES PATENT OFFICE
CERTIFICATE OF CORRECTION

Patent No. 3,791,748            Dated February 12, 1974

Inventor(s)  Stanley R. Goodrich, Jr., et al.

It is certified that error appears in the above-identified patent and that said Letters Patent are hereby corrected as shown below:

[73] Assignee: "Dart Industries, Inc., Los Angeles, Calif."

should read -- General Motors Corporation, Detroit, Mich. --.

Column 5, line 28, "potion" should read -- portion --.

Column 6, line 20, "iniitally" should read -- initially --;

line 21, "sapced" should read -- spaced --.

Signed and sealed this 17th day of September 1974.

(SEAL)
Attest:

McCOY M. GIBSON JR.
Attesting Officer

C. MARSHALL DANN
Commissioner of Patents